US009618397B2

(12) United States Patent
Volk

(10) Patent No.: US 9,618,397 B2
(45) Date of Patent: Apr. 11, 2017

(54) MULTI-STAGE TEMPERATURE INDICATING DEVICE

(71) Applicant: Volk Enterprises, Inc., Turlock, CA (US)

(72) Inventor: Drew Anthony Volk, Turlock, CA (US)

(73) Assignee: Volk Enterprises, Inc., Turlock, CA (US)

(*) Notice: Subject to any disclaimer, the term of this patent is extended or adjusted under 35 U.S.C. 154(b) by 152 days.

(21) Appl. No.: 14/812,096

(22) Filed: Jul. 29, 2015

(65) Prior Publication Data

US 2017/0030780 A1 Feb. 2, 2017

(51) Int. Cl.
| *G01K 11/06* | (2006.01) |
| *G01K 11/00* | (2006.01) |
| *G01K 1/02* | (2006.01) |
| *G01K 1/08* | (2006.01) |
| *G01K 1/14* | (2006.01) |
| *G01K 13/00* | (2006.01) |

(52) U.S. Cl.
CPC ................ *G01K 11/06* (2013.01); *G01K 1/02* (2013.01); *G01K 1/08* (2013.01); *G01K 1/14* (2013.01); *G01K 11/00* (2013.01); *G01K 13/00* (2013.01)

(58) Field of Classification Search
CPC .......... G01K 11/06; G01K 11/00; G01K 1/02; G01K 1/08; G01K 1/14; G01K 13/00
USPC ........ 116/101, 102, 106, 200, 201, 216–218, 116/DIG. 1; 374/104, 155, 160
See application file for complete search history.

(56) References Cited

U.S. PATENT DOCUMENTS

| 3,090,235 | A | * | 5/1963 | Houser | ................ | G01K 11/06 |
| | | | | | | 374/104 |
| 3,140,611 | A | * | 7/1964 | Kliewer | ................ | G01K 11/06 |
| | | | | | | 337/416 |
| 3,479,876 | A | * | 11/1969 | Kliewer | ................... | G01K 1/02 |
| | | | | | | 116/217 |
| 3,548,780 | A | * | 12/1970 | Kliewer | ................ | G01K 11/00 |
| | | | | | | 116/218 |
| 3,759,103 | A | * | 9/1973 | Volk | ...................... | G01K 11/08 |
| | | | | | | 116/218 |
| 4,082,000 | A | * | 4/1978 | Volk | ....................... | G01K 11/06 |
| | | | | | | 116/202 |
| 4,421,053 | A | | 12/1983 | Volk | | |
| 4,748,931 | A | | 6/1988 | Volk | | |
| 5,323,730 | A | * | 6/1994 | Ou-Yang | ................ | G01K 11/06 |
| | | | | | | 116/218 |
| 5,487,352 | A | * | 1/1996 | Williams | ............... | G01K 11/06 |
| | | | | | | 116/217 |
| 5,537,950 | A | * | 7/1996 | Ou-Yang | ................ | G01K 11/06 |
| | | | | | | 116/217 |

(Continued)

*Primary Examiner* — R. A. Smith
*Assistant Examiner* — Tania Courson
(74) *Attorney, Agent, or Firm* — Laurence P. Colton; Smith Tempel Blaha LLC

(57) ABSTRACT

A multi-stage temperature indicating device having a first elongate housing and an indicator assembly, the indicator assembly being slidably positioned in a first bore of the first elongate housing and having a middle indicator stem and an inner indicator stem. The multi-stage temperature indicating device also has a means for urging an inner indicator stem, to a second set stroke, out of the middle indicator stem, and for sliding the middle indicator stem, to a first set stroke, out of the first elongate housing.

15 Claims, 11 Drawing Sheets

(56) References Cited

U.S. PATENT DOCUMENTS

| | | |
|---|---|---|
| 5,799,606 A | 9/1998 | Volk |
| 5,988,102 A | 11/1999 | Volk |
| 8,480,299 B2 | 7/2013 | Thompson |
| 8,752,500 B2 * | 6/2014 | Wangler ................ G01K 11/06 |
| | | 116/218 |
| 2005/0211153 A1 * | 9/2005 | Ribi ..................... G01K 11/06 |
| | | 116/218 |

* cited by examiner

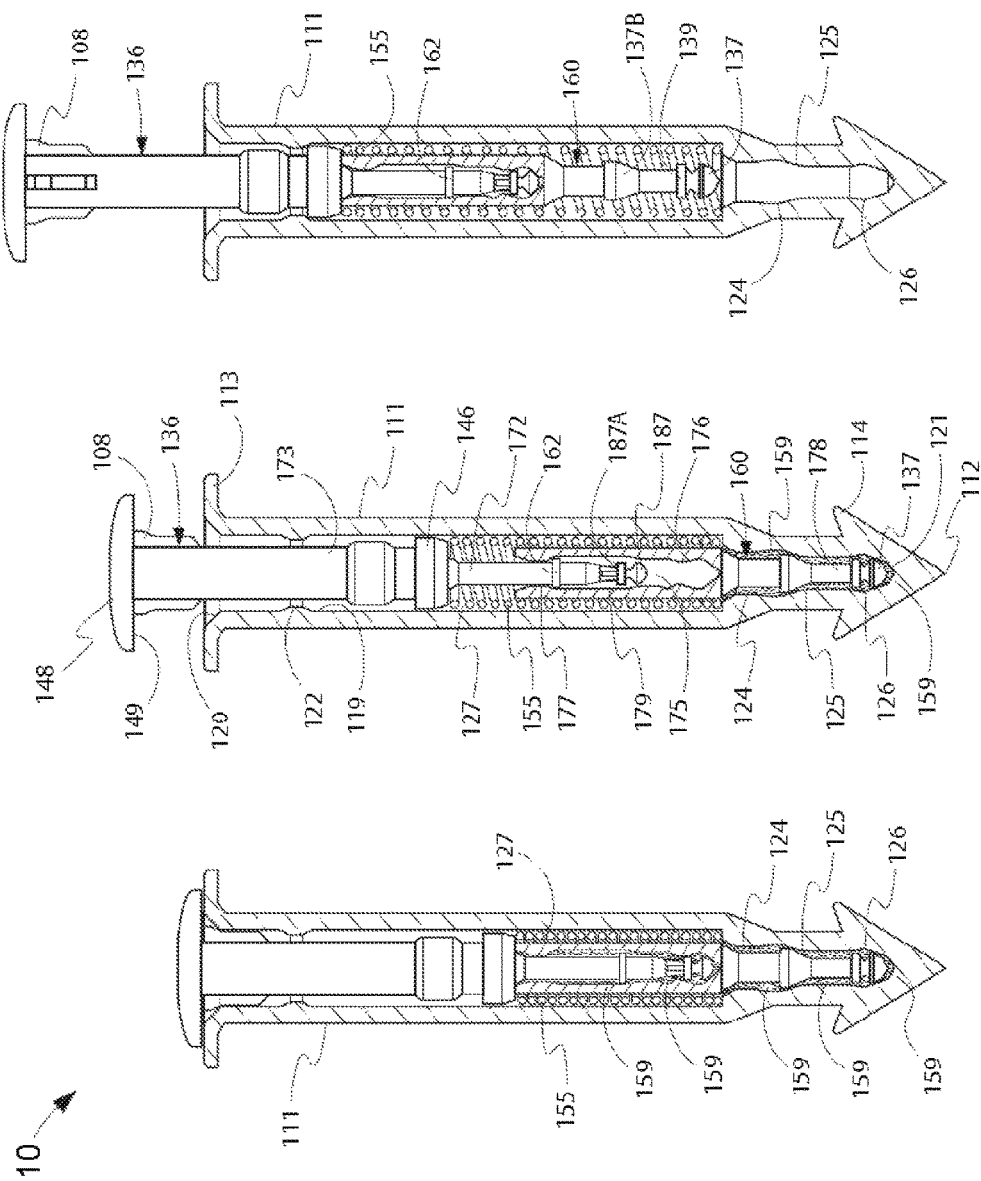

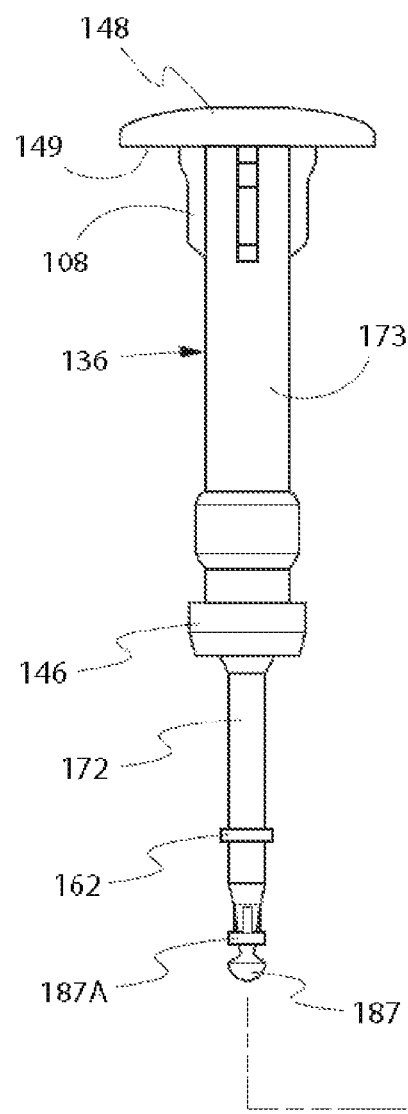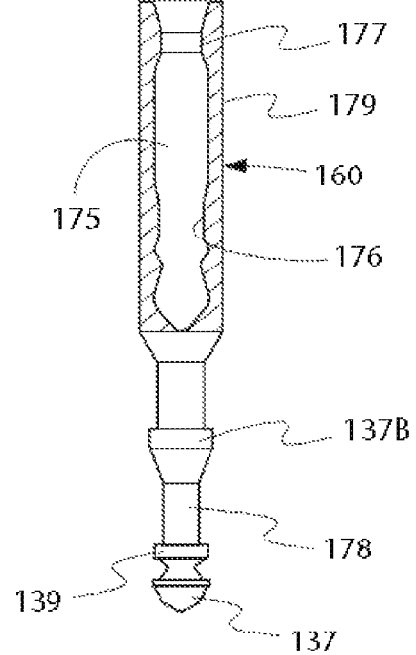
Fig. 2A
(Prior Art)
Fig. 2B
(Prior Art)

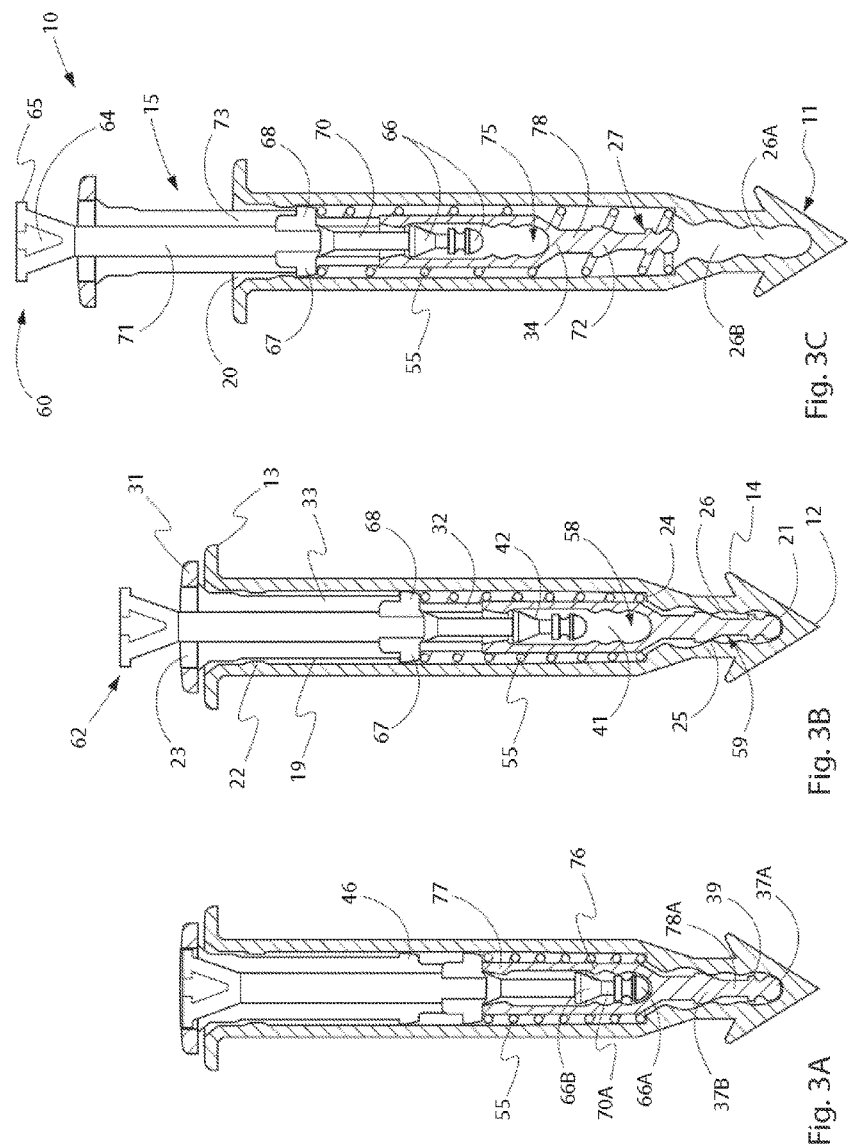

MULTI-STAGE TEMPERATURE INDICATING DEVICE

BACKGROUND OF THE INVENTION

Field of the Invention

This invention relates generally to a temperature indicating device providing a visual indication of when a certain temperature or temperatures have been reached and, more particularly, to a multi-stage temperature indicating device for use in cooking foods providing a visual indication of when, preferably, at least two different specific temperatures have been reached, such as when a first temperature has been reached and then when a second temperature has been reached. This invention also relates to a temperature indicating device having a pre-indicator feature that visually indicates that a specific end point temperature will be reached within a specific time.

Description of the Related Art

Temperature indicating devices are known and have been used for measuring internal temperatures when cooking meat, poultry, and the like. Such temperature indicating devices typically include a barrel-shaped housing and an indicator rod retained in the barrel by a fusible material. When a predetermined temperature is reached, the fusible material softens, releasing the indicator rod from the barrel to provide a visual indication that the product is fully cooked to the predetermined temperature. With the temperature indicating device, a consumer may safely prepare meat or poultry without overcooking the product. U.S. Pat. Nos. 4,748,931, 5,799,606, and 5,988,102 disclose representative examples of such temperature indicating devices.

To ensure the temperature indicating device provides a reliable, accurate indication of the internal temperature of the product, the fusible material must securely retain the indicator rod within the housing until the temperature indicating device has been heated to a predetermined temperature. Most current temperature indicating devices indicate only one temperature, namely, the temperature at which the temperature indicating device is designed to activate. However, devices that can indicate two different temperatures are known, and U.S. Pat. Nos. 4,421,053 and 8,480,299 discloses temperature indicating devices that indicate at least two different temperatures.

There has been a very high interest in the cooking industry for a temperature indicating device that communicates cooking progression via readily discernable, easy to interpret visual indications. For example, it would be advantageous for cooks to know approximately when the main course (the turkey or the roast beef, for example) will be ready. Thus, such a device could indicate approximately when the main course will be ready by giving a first indication at a first approximate temperature (or approximate time prior to final activation), a pre-indication, alerting the cook that the main course will be ready within a certain period of time and allowing the cook time to prepare other dishes for the meal before the main course is ready. This device could assist the cook in knowing when the device is going to activate indicating that the food is done cooking, a final indication. This device also could indicate when a first temperature has been reached and then indicate when a second, higher, temperature has been reached, such that the cook is informed that there is a certain limited time period before the food is thoroughly cooked. This device further could assist cooks in knowing when the more difficult "medium" (as opposed to rare or well-done) temperatures have been reached.

To date, the industry has not been able to provide a satisfactory disposable temperature indicating device with precise multiple temperature indications. The present invention is meant to address these needs for a disposable precision multi-stage temperature indicating device. It is to this need and others that the present invention is directed.

BRIEF SUMMARY OF THE INVENTION

Briefly, the present invention is a multi-stage temperature indicating device. One embodiment of the multi-stage temperature indicating device comprises a first elongate housing and an indicator assembly. The indicator assembly generally comprises an inner indicator stem slidably arranged in a bore of a middle indicator stem. The indicator assembly is slidably positioned in a bore of the first elongate housing, termed the housing bore or the first bore. The multi-stage temperature indicating device also comprises a means for urging the middle indicator stem to a second set stroke length or distance, out of the housing bore, and for sliding the inner indicator stem to a first set stroke length or distance out of the bore of the middle indicator stem.

The first elongate housing defines the longitudinally extending housing bore having an open first end opposite a closed second end, and a first internal cavity and a second internal cavity between the open first end and the closed second end. The first internal cavity has an internal first narrowed bore region proximal to the closed end and a second narrowed bore region spaced from the first narrowed bore region. The first internal cavity is defined between a first end of the first narrowed bore region proximal to the closed second end of the housing bore and a second end of the second narrowed bore region distal from the first narrowed bore region. A second end of the first narrowed bore region is proximal and communicates with a first end of the second narrowed bore region. The second internal cavity is defined between the second end of the second narrowed bore region and the open first end of the housing bore.

The indicator assembly comprises the middle indicator stem, the inner indicator stem, and a fusible material. The fusible material can be a single first fusible material, or two separate fusible materials, such as a first fusible material and a second fusible material that is different from the first fusible material. The middle indicator in turn is nested within the housing bore and is retained within the housing bore by the first fusible material. A separate portion of the first fusible material (if only a single first fusible material is used) or the second fusible material (if a first fusible material and a second fusible material that is different from the first fusible material are used) is located within the first and/or second narrowed bore regions of the first internal cavity of the first elongate housing. The inner indicator is nested within the bore of the middle indicator stem and is retained within the bore of the middle indicator stem by the separate portion of the first fusible material or the second fusible material. The first fusible material is located within the bore of the middle indicator stem proximal to a closed end of the bore of the middle indictor stem. An embodiment of the invention comprising a first fusible material and a second fusible material different from the first fusible material will be used as the illustrative embodiment in this disclosure; however, it should be kept in mind that the first fusible material and the second fusible material can be the same fusible material.

The middle indicator stem operates as a second elongate housing nested within the first elongate housing. The middle indicator stem defines a longitudinally extending bore, termed the middle bore or the second bore, and comprises an internal cavity and a first front portion or stem stretch. The longitudinally extending second bore of the middle indicator stem has an open end, a closed end, and a narrowed bore region there between. The internal cavity is defined between the narrowed bore region and the closed end. The first front portion or stem stretch of the middle indicator stem extends outwardly from the closed end, away from the open end, and is received within the first internal cavity of the first elongate housing. The middle indicator stem further comprises a means for preventing the middle indicator stem from sliding within the housing bore beyond the second set stroke distance or length, and also from sliding out of the housing bore. The open end of the middle indicator comprises a second temperature indicating means.

The inner indicator stem is slidably positioned in the bore of the middle indicator stem. The inner indicator stem comprises a first stem stretch, a second stem stretch terminating in a first temperature indicating means, an engagement portion, and a means for preventing the inner indicator stem from sliding beyond the first set stroke distance or length out of the bore of the middle indicator stem. A first portion of the first stem stretch of the inner indicator stem is received within the internal cavity of the middle indicator stem. The engagement portion of the inner indicator stem separates the first stem stretch from the second stem stretch and extends through slots in the side of the middle indicator stem into the second internal cavity of the first elongate housing.

Returning to the multi-stage temperature indicating device, in general, the second fusible material is in the first internal cavity of the first elongate housing and the first fusible material is in the internal cavity of the middle indicator stem. The first fusible material may be configured to soften at a first temperature. The second fusible material may be configured to soften at a second temperature. If so, the first temperature is lower than the second temperature, whereby the first fusible material softens at a lower temperature than the second fusible material, thus releasing the inner indicator stem from the middle indictor stem prior to the middle indicator stem being released from the first elongate housing.

It may also be the case that the first fusible material softens at the same temperature as the second fusible material. This also would be the case if the first fusible material and the second fusible material is the same fusible material. If so, the first fusible material may soften earlier than the second fusible material simply because of the disparate rates of heat diffusion through the device affecting the first fusible material, at the first internal cavity, and the second fusible material, at the third internal cavity.

The means for urging the inner indicator stem within the middle indicator stem, and for sliding the middle indicator stem within the first elongate housing, is situated in the second internal cavity of the first elongate housing. Preferably, a single means for urging operates on both the inner indicator and the middle indicator. A spring, elastic devices, compression devices, and in some instances tension devices, all are suitable for use as a means for urging.

The first portion of the first stem stretch of the inner indicator stem is received within the internal cavity of the middle indicator stem and is surrounded by the first fusible material. In the embodiments having fusible materials with disparate melting temperatures, at temperatures below the critical or triggering temperature of the first fusible material, the first fusible material retains the first portion of the first stem stretch of the inner indicator stem within the internal cavity of the middle indicator stem. When the first fusible material reaches the critical or triggering temperature of the first fusible material, the first fusible material softens and releases the inner indicator. The means for urging then displaces the inner indicator stem out of the middle indicator stem to a first set stroke distance or length.

The front portion or stem stretch of the middle indicator is received within the first internal cavity of the housing bore and is surrounded by the second fusible material. At temperatures below the critical or triggering temperature of the second fusible material, the second fusible material retains the front portion or stem stretch of the middle indicator within the first internal cavity of the housing bore. When the second fusible material reaches the critical or triggering temperature of the second fusible material, the second fusible material softens and releases the middle indicator. The means for urging then displaces the middle indicator out of the first internal cavity of the housing bore to a second set stroke distance or length.

In use, the temperature indicator is placed in the substrate, which is in a preferred embodiment a type of meat or other food, in an appropriate manner. As the substrate is heated, such as being cooked, the inserted temperature indicator also is heated. When the volume of the substrate in which the temperature indicator reaches the first temperature, which is the critical or triggering temperature for the first fusible material, the first fusible material softens. The means for urging, such as a spring initially in compression, then displaces the inner indicator stem out of the middle indicator stem to the first set stroke distance or length. The upper portion of the inner indicator, the means for indicating, is thus extended out of the middle indicator and is visible to the user, such as a cook. This indicates that the substrate has reached the first temperature. In the cooking of food, the first temperature can be, for example, when the meat is cooked to the "rare" temperature, whereby portions of the meat can be carved off for serving as "rare". Alternatively, the first temperature can indicate to the cook that the meat is almost done, or that there meat will be done in a certain period of time.

When the volume of the substrate in which the temperature indicator reaches the second temperature, which is the critical or triggering temperature for the second fusible material, the second fusible material softens. The means for urging, which in the embodiment of a spring initially in compression has not been fully decompressed, then displaces the middle indicator stem out of the housing bore to the second set stroke distance or length. The upper portion of the middle indicator, the means for indicating, is thus extended out of the middle indicator and is visible to the user, or cook. The upper portion of the inner indicator, the means for indicating, is thus extended farther out relative to the first elongated housing and is even more visible to the user, or cook. This indicates that the substrate has reached the second temperature. In the cooking of food, the second temperature can be, for example, when the meat is cooked to the desired final temperature, whereby the meat can be considered "done" or "fully cooked".

A complete understanding of the present invention may be obtained by reference to the accompanying drawings, when considered in conjunction with the subsequent, detailed description of preferred embodiments in which like elements and components bear the same designations and numbering throughout the figures.

BRIEF DESCRIPTION OF THE DRAWINGS

FIGS. 1A-1C show cross sectional views of a prior art multi-stage temperature indicating device, with FIG. 1A showing a cross sectional view of a prior art multi-stage temperature indicating device in the inactivated position, FIG. 1B showing a cross sectional view of a prior art multi-stage temperature indicating device in a first activated position, and FIG. 1C showing a cross sectional view of a prior art multi-stage temperature indicating device in a second activated position.

FIGS. 2A and 2B are views of the prior art indicator rod and an extension segment of the embodiment of the present invention shown in FIGS. 1A-1C, with FIG. 2A showing a side view of the indicator rod and FIG. 2B showing a cross sectional view of the extension segment, and the dashed line between FIG. 2A and FIG. 2B showing the connecting relationship between the indicator rod and the extension segment.

FIG. 3A is a cross sectional view of a multi-stage temperature indicating device of the present invention in the inactivated position.

FIG. 3B is a cross sectional view of a multi-stage temperature indicating device of the present invention in a first activated position.

FIG. 3C is a cross sectional view of a multi-stage temperature indicating device of the present invention in a second activated position.

DETAILED DESCRIPTION OF PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

One embodiment of the multi-stage temperature indicating device of the present invention comprises nested stems that will allow the temperature indicator device to give a visual indication of specific multiple temperatures, or as a pre-indicator that the end point temperature will be reached within a specific time. For example, in one embodiment, which is the illustrative embodiment described in this disclosure, the temperature indicating device can provide a visual indication to the user that the food product will reach an acceptable temperature level and doneness within a specific time period. In another embodiment, the device allows more than one end point temperature to be indicated, so that the user can choose which temperature to use, for example, the first temperature can indicate that the meat is cooked to "rare" and the second temperature can indicate that the meat is cooked to "medium well", or any other combination.

FIGS. 1A-1C are cross sectional views of one embodiment of a prior art multi-stage temperature indicating device, with FIG. 1A being in the inactivated position, FIG. 1B being in the first activated position, and FIG. 10 being in the second activated position. FIGS. 2A and 2B are views of an indicator rod and extension segment of the prior art embodiment shown in FIGS. 1A-1C, with FIG. 2A showing a side view of the indicator rod and FIG. 2B showing a cross sectional view of the extension segment, and the dashed line between FIG. 2A and FIG. 2B showing the connecting relationship between the indicator rod and the extension segment. In particular, the extension segment has a stretch with a hollow interior rather than the indicator rod having the stretch with the hollow interior, which is structurally distinct from the present invention. This prior art device comprises only one indicating means, which extends outwards from the housing a first distance when the device reaches a first temperature and extends outwards a second distance when a second temperature is reached. Thus, the cook is presented with only one visual indicator structure extending different distances outwardly from the meat. This can be visually confusing, as the cook may not at first glance know if the indicating means is extending out the full second distance or only the partial first distance. This prior art embodiment can generally serve to provide a background for this class of device, to which the present invention generally belongs.

Figure 4A:
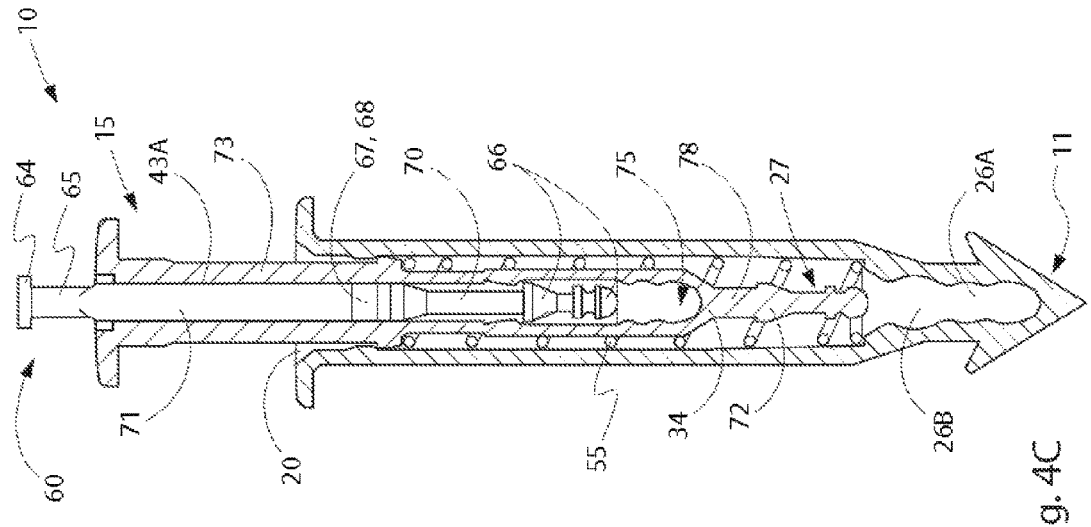
FIG. 4A is a cross sectional view of the embodiment of the present invention shown in FIG. 3A, but turned 90 degrees.
Figure 4B:
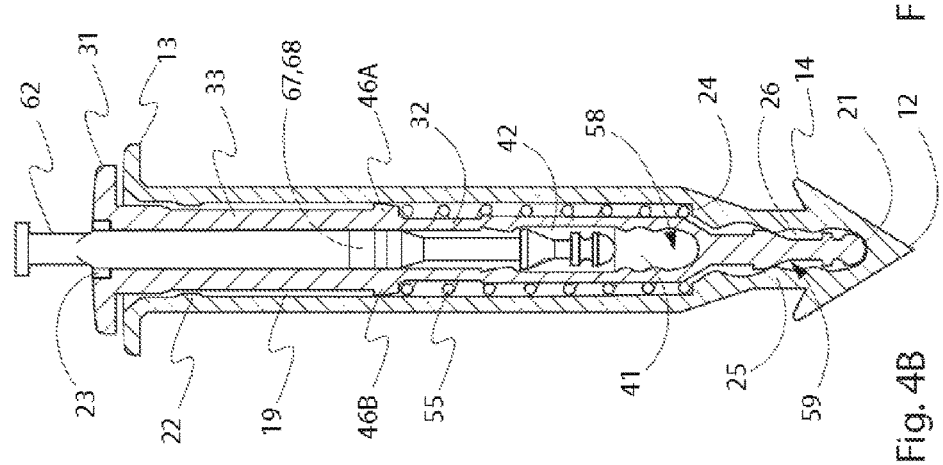
FIG. 4B is a cross sectional view of the embodiment of the present invention shown in FIG. 3B, but turned 90 degrees.
Figure 4C:
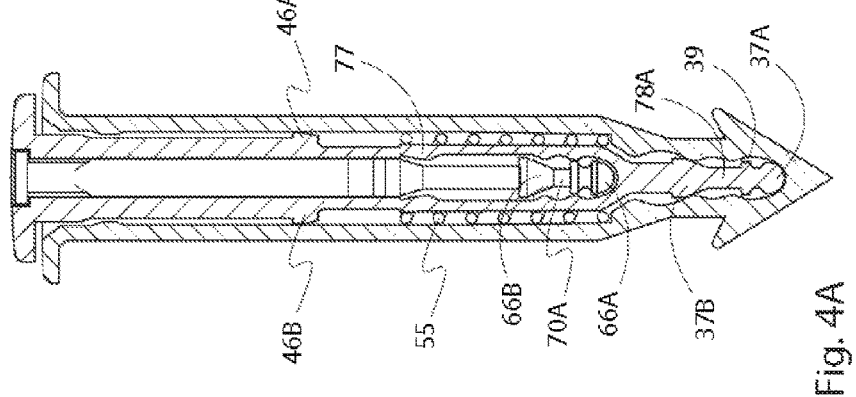
FIG. 4C is a cross sectional view of the embodiment of the present invention shown in FIG. 3C, but turned 90 degrees.
Figure 5A:
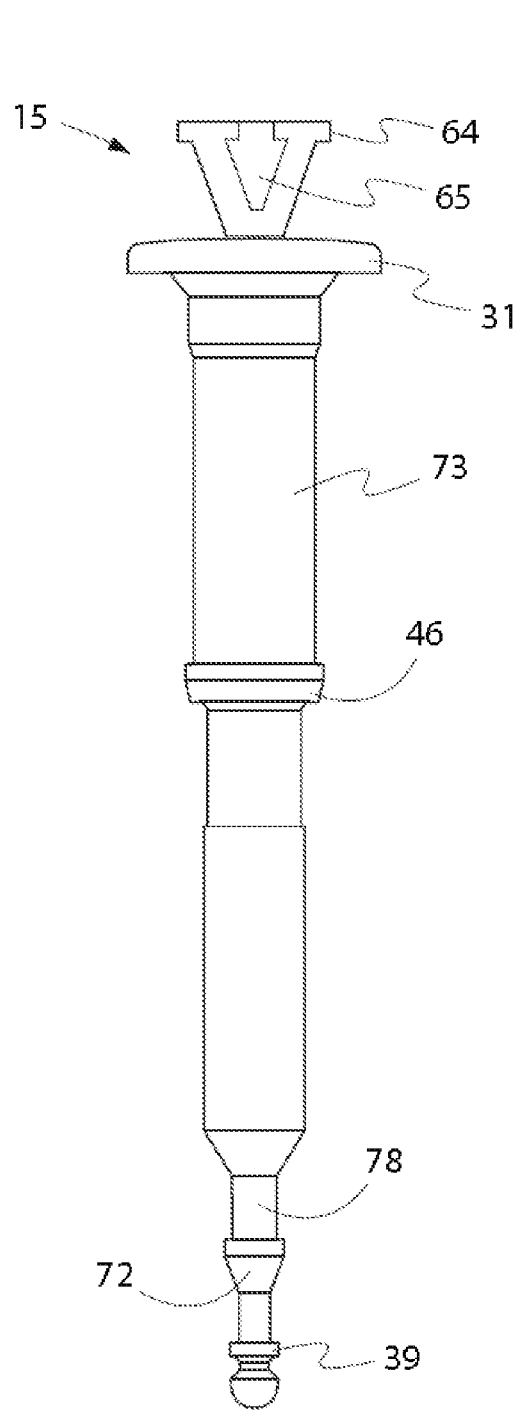
FIG. 5A is a side view of an indicator assembly of the embodiment of the present invention shown in FIGS. 3 and 4, primarily showing the external of a middle indicator assembly with an inner indicator stem in the activated position.
Figure 5B:
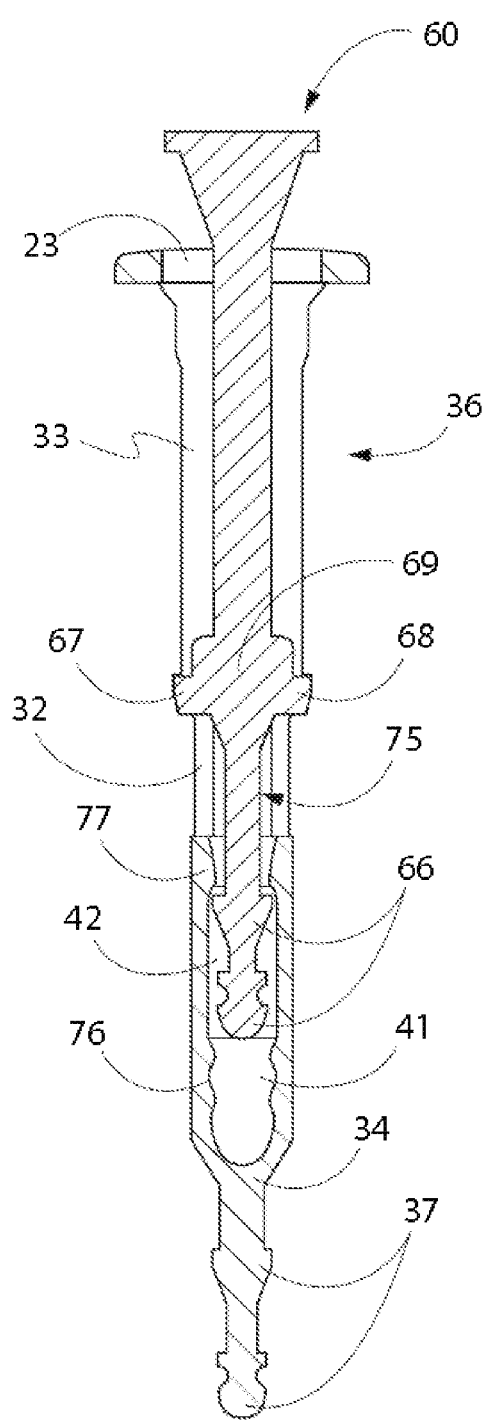
FIG. 5B is a cross sectional view of the indicator assembly of the embodiment of the present invention shown in FIG. 5A, primarily showing both the middle indicator stem and the inner indicator stem, with the inner indicator stem in the activated position.
Figure 6A:
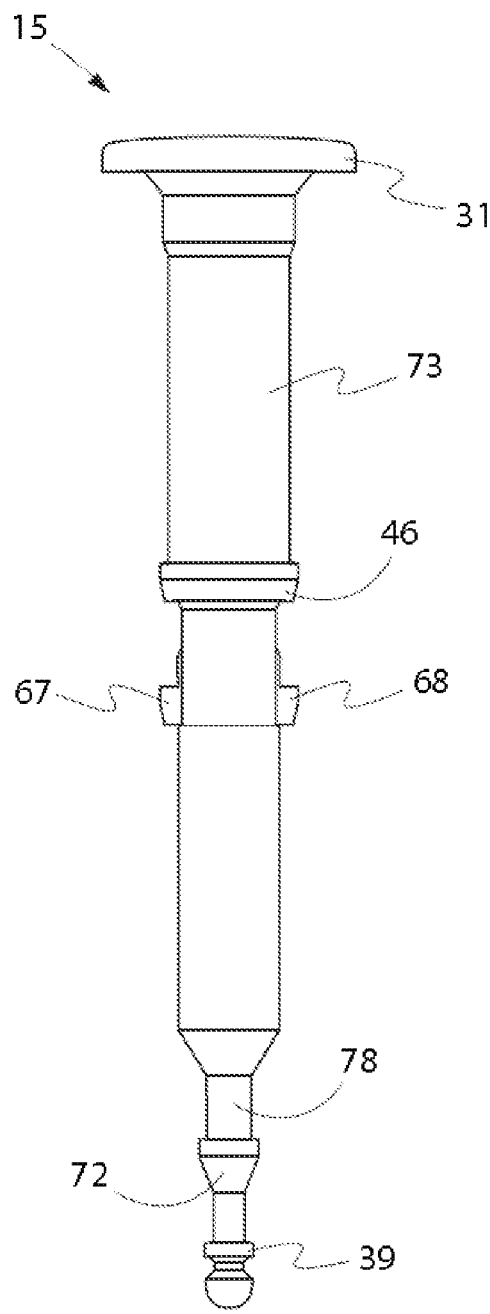
FIG. 6A is a side view of the indicator assembly of the embodiment of the present invention shown in FIGS. 3 and 4, primarily showing the external of the middle indicator stem with the inner indicator stem in the inactivated position.
Figure 6B:
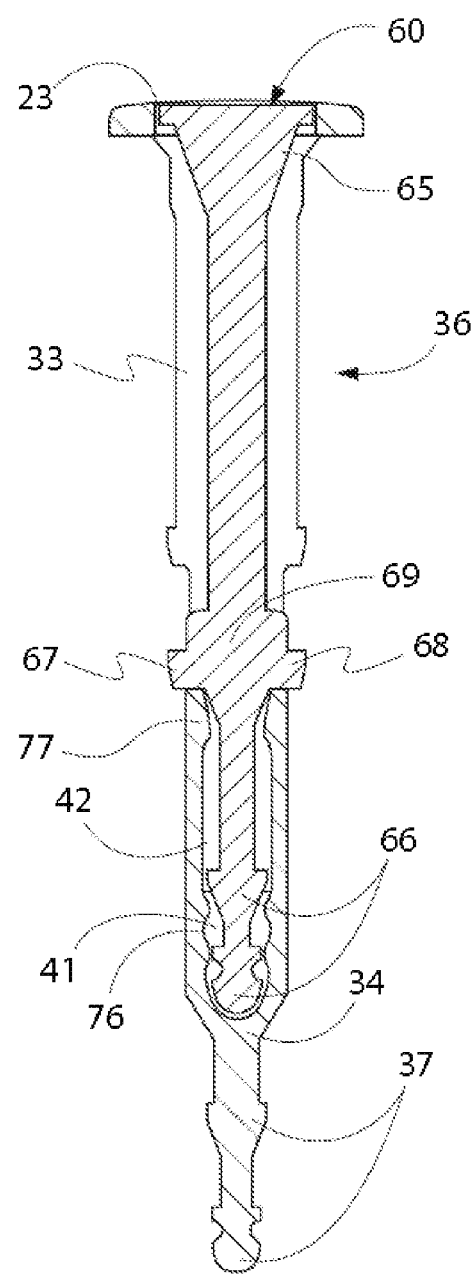
FIG. 6B is a cross sectional view of the indicator assembly of the embodiment of the present invention shown in FIG. 6A, primarily showing both the middle indicator stem and the inner indicator stem, with the inner indicator stem in the inactivated position.
Figure 7A:
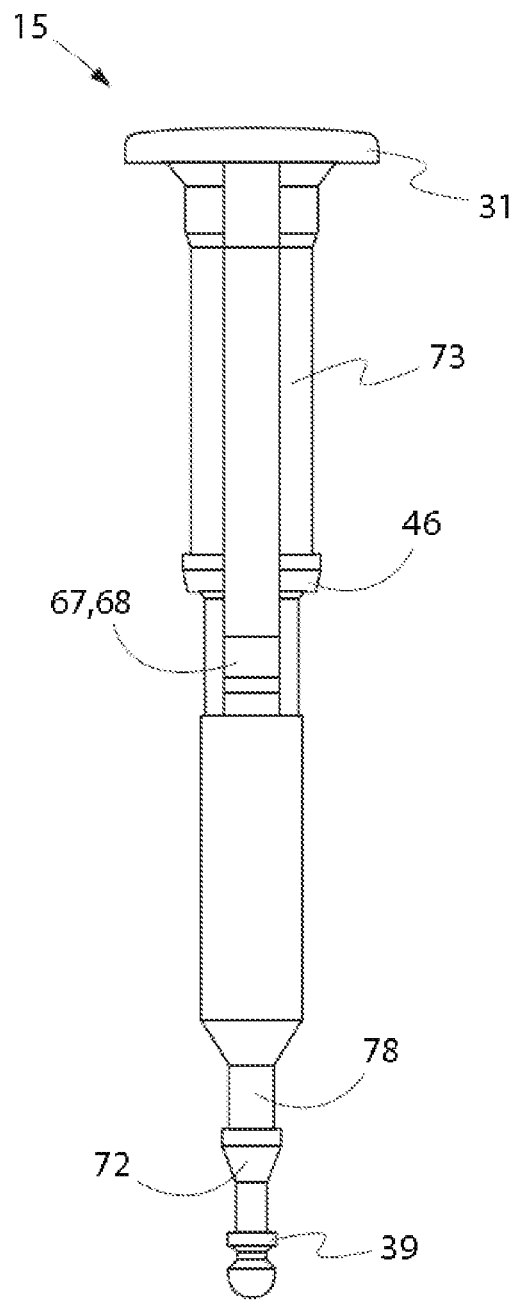
FIG. 7A is a side view of the indicator assembly of the embodiment of the present invention shown in FIG. 6A, but turned 90 degrees, and primarily showing the external of the middle indicator stem with the inner indicator stem in the inactivated position.
Figure 7B:
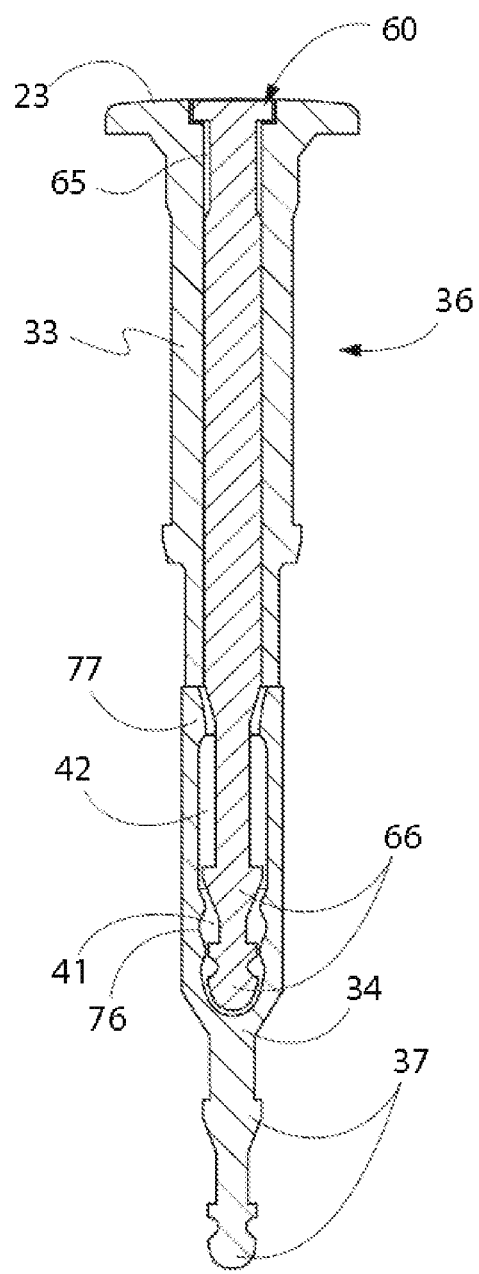
FIG. 7B is a cross sectional view of the indicator assembly of the embodiment of the present invention shown in FIG. 7A, primarily showing both the middle indicator stem and the inner indicator stem, with the inner indicator stem in the inactivated position.
Figure 8:
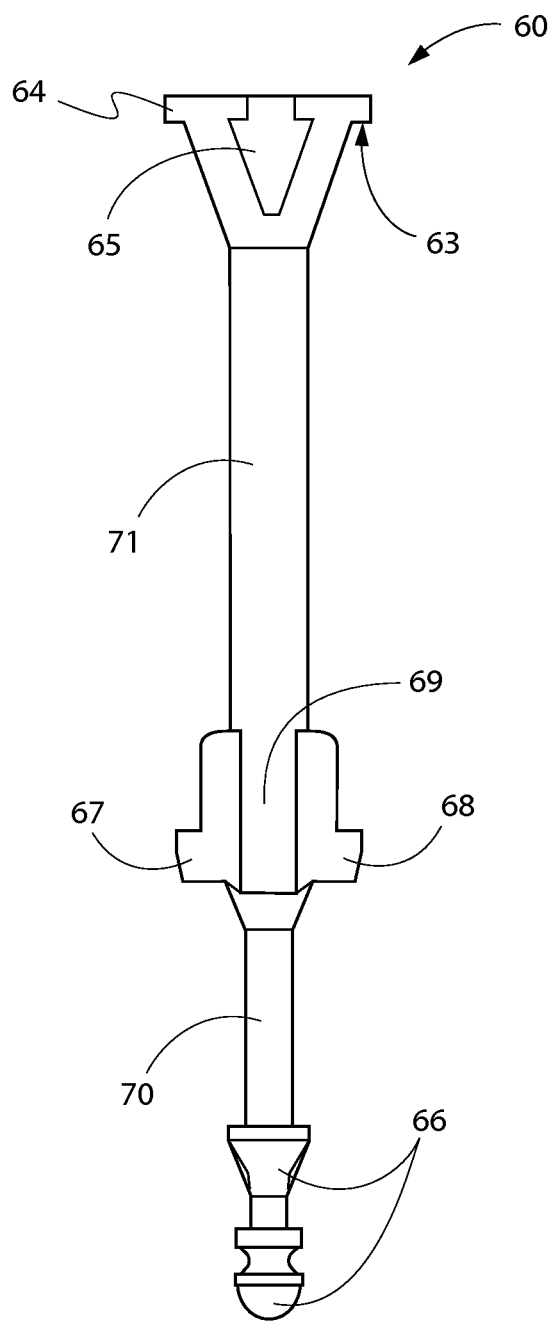
FIG. 8 is a side view of an inner indicator stem of the embodiment of the present invention shown in FIGS. 3-7.

FIGS. 3A-3C and 4A-4C are cross sectional views of a first embodiment of the present invention, with FIGS. 3A and 4A being in the inactivated position, FIGS. 3B and 4B being in the first activated position, and FIGS. 3C and 4C being in the second activated position. The views of FIGS. 3A-3C and the views of FIGS. 4A-4C are of the same embodiment of the present invention, with the views of FIGS. 4A-4C turned or rotated 90 degrees from the views of FIGS. 3A-3C, respectively. FIGS. 5A-5B, 6A-6B, and 7A-7B are views of the indicator assembly of the first embodiment shown in FIGS. 3A-3C and 4A-4C, which is made up of a middle indicator stem with a nested inner indicator stem. FIGS. 5A, 6A, and 7A show a side view and FIGS. 5B, 6B, and 7B show a cross sectional view of the indicator assembly. FIG. 8 is a side view of the inner indicator stem of the embodiment shown in FIGS. 3A-3C, 4A-4C, and 5A-5B.

Figure 9:
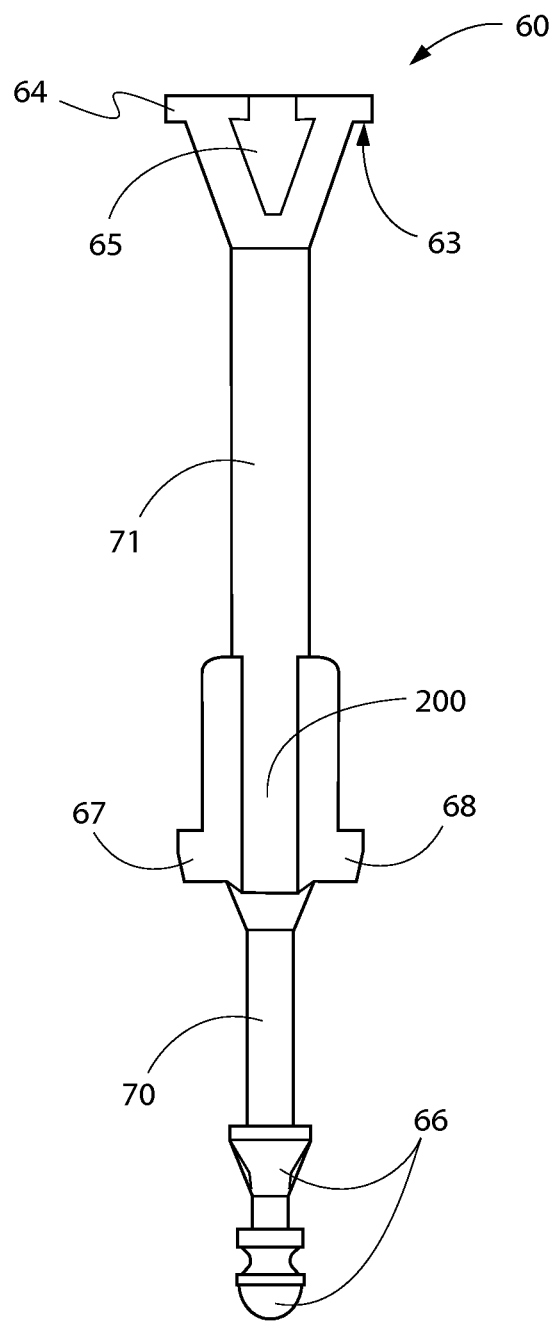
FIG. 9 is a side view of an alternate embodiment of an inner indicator stem.
Figure 10A:
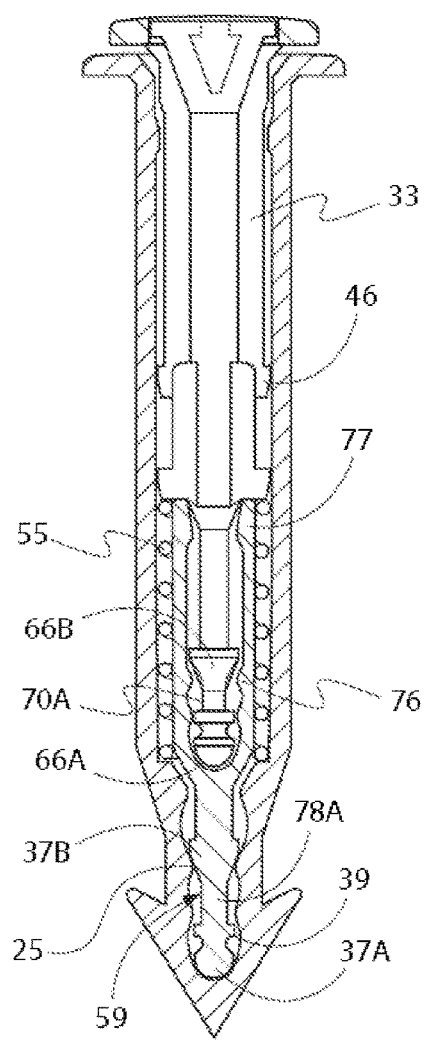
FIG. 10A is a cross sectional view of a multi-stage temperature indicating device of the present invention, primarily showing an indicator assembly in the inactivated position, with the inner indicator stem of FIG. 9 in the inactivated position.
Figure 10B:
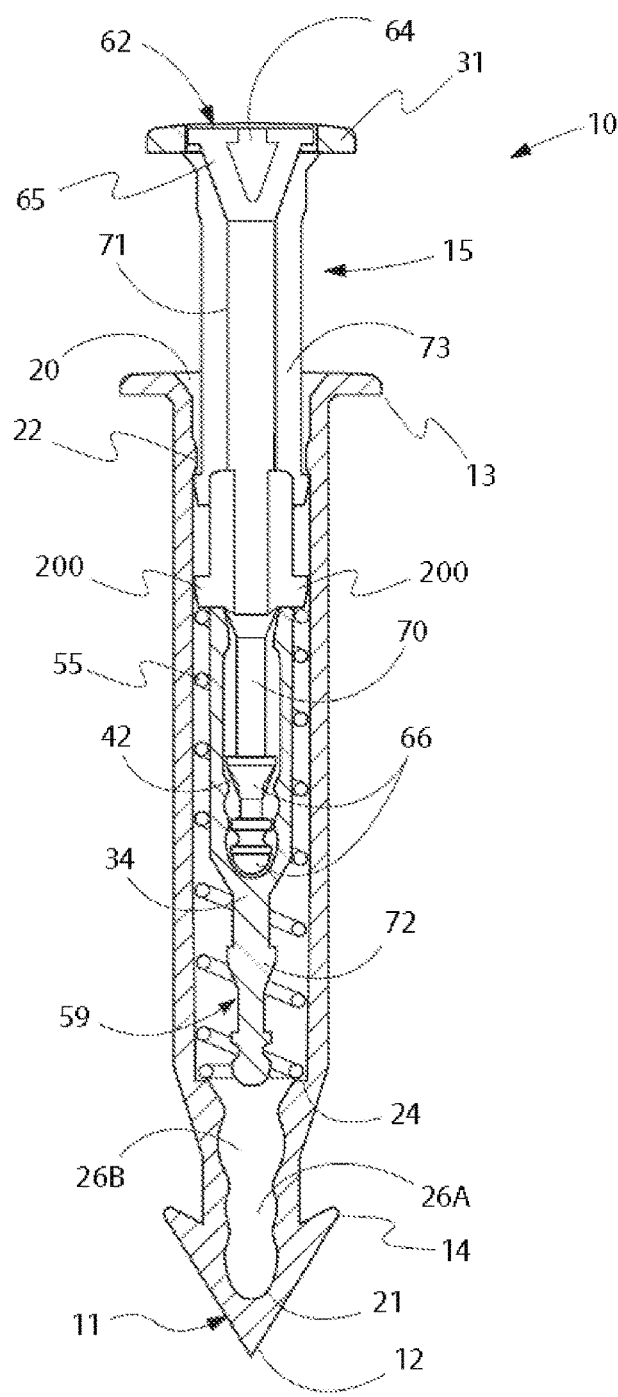
FIG. 10B is cross sectional view of the multi-stage temperature indicating device of FIG. 10A, primarily showing the indicator assembly in the activated position, with the inner indicator stem of FIG. 9 in the inactivated position.
Figure 11A:
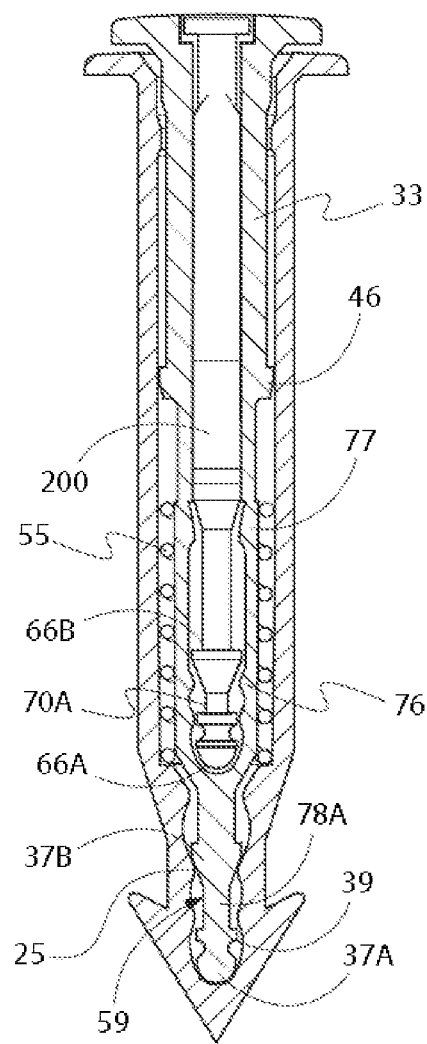
FIG. 11A is a cross sectional view of a multi-stage temperature indicating device of FIG. 10A, but turned 90 degrees.
Figure 11B:
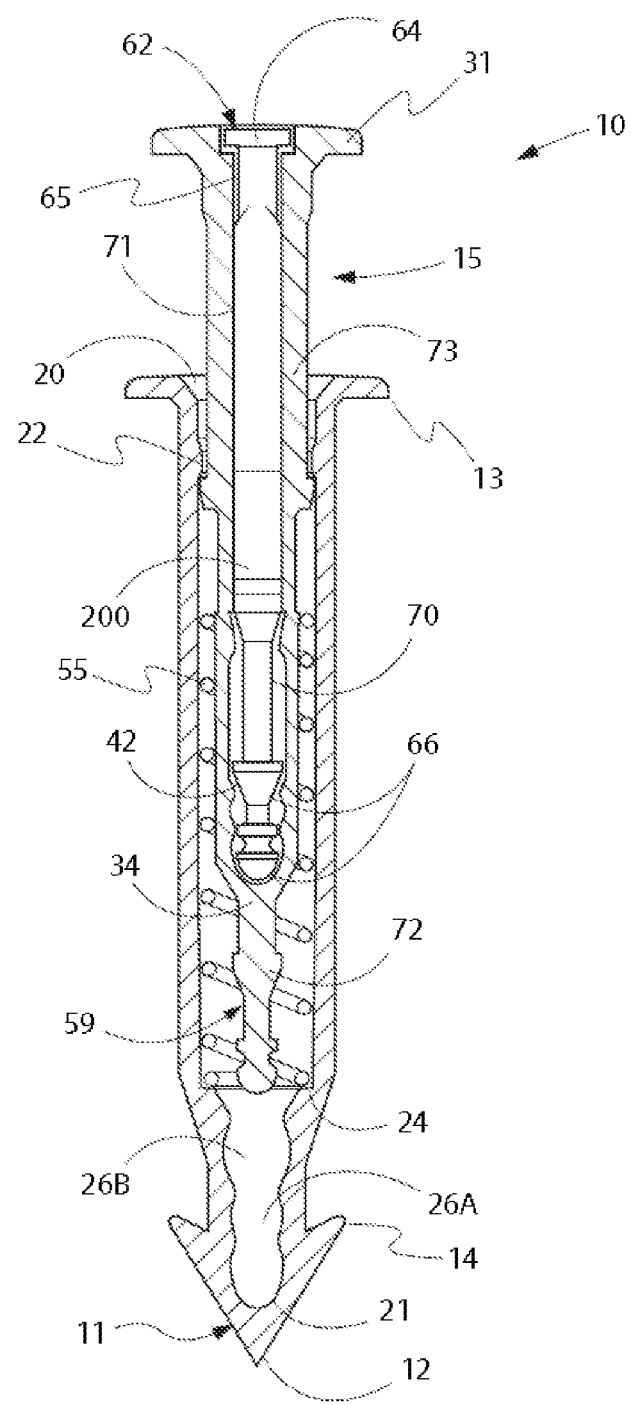
FIG. 11B is cross sectional view of the multi-stage temperature indicating device of FIG. 10B, but turned 90 degrees.

FIG. 9 is a side view of a second embodiment of the inner indicator stem. FIGS. 10A-10B and 11A-11B are cross sectional views of the second embodiment of the inner indicator stem of FIG. 9, with FIGS. 10A and 11A showing an indicator assembly in the inactivated position, with an inner indicator stem in the inactivated position, and FIGS. 10B and 11B showing the indicator assembly in the activated position, with the inner indicator assembly in the inactivated position.

A preferred embodiment of the multi-stage temperature indicating device of the present invention is configured such that the inner indicator stem biased by the spring is released into an extended position upon attainment of a first specified temperature, and such that the middle indicator stem biased by the spring is released into an extended position upon attainment of a second specified temperature. When both the inner indicator stem and the middle indicator stem are in their respective extended positions, the multi-stage temperature indicating device provides a visual indication to a user that the substrate has reached a first temperature and then has reached a second temperature, respectively. The second specified temperature often is an acceptable temperature level and doneness when the device is used in connection with cooking food.

Referring now to FIGS. 1A-1C and 2A-2B, a prior art multi-stage temperature indicating device 110 is shown. As the present invention is an improvement on the general category of the known temperature indicating device as represented by FIGS. 1A-1C and 2A-2B, this known apparatus will be described in detail to provide a background for understanding the basic structure and function of the present invention.

This embodiment comprises an elongate housing 111 formed with a longitudinally extending bore 119 having an open end 120 proximate the flange 113 and a closed end 121 near the pointed tip 112. A plurality of barbs 114 (here shown two in number) are formed on the exterior of the housing 111. The prior art device 110 may be inserted into poultry, meat, or other products by positioning the pointed tip 112 against the product and pressing the device 110 inwardly until the underside of flange 113 engages the outer surface of the product.

The interior of the housing 111 includes a shaped first internal cavity 126 and a generally cylindrical second internal cavity 127. The first internal cavity 126 comprises a neck region 124 and a narrowed bore 125. The indicator rod 136 includes a first stem stretch 172 and a second stem stretch 173. The first stem stretch 172 is a generally solid cylindrical structure for cooperating with at least a portion of the extension segment 160, which comprises a hollow section, and the second stem stretch 173 is a generally solid cylindrical structure having an overall diameter greater than the diameter of the first stem stretch 172. The collar 146 separates the first stem stretch 172 from the second stem stretch 173 and preferably has a greater cross sectional diameter than either of the stem stretches 172, 173, such that the top surface of the collar 146 can interact with the restriction 122 to prevent the indicator rod 136 from fully exiting the housing 111 and such that the bottom surface of the collar 146 can interact with a spring 155 as disclosed in more detail below. If desired, the collar 146 may simply be a shoulder between the second stem stretch 173 and the first stem stretch 172.

The first stem stretch 172 is a generally cylindrical rod having a first enlarged front end portion 187 at the free end of the first stem stretch 172, an optional second enlarged front end portion 187A proximal to but spaced apart from the first enlarged front end portion 187, and a stop 162. The first stem stretch 172 is snapped into a hollow interior 175 of the second extension stretch 179 of the extension segment 160. The stop 162 cooperates with an interior stop 177 located on the interior surface of bore 176 of the hollow interior 175 of the second extension stretch 179 to prevent the indicator rod 136 from fully disengaging from the hollow interior 175 of the extension segment 160.

The extension segment 160 is a generally cylindrical rod having an enlarged front end portion 137 at the end of a first extension stretch 178 and a generally hollow cylindrical second extension stretch 179 for accommodating at least a portion of the first stem stretch 172 of the indicator rod 136. The extension segment also may comprise a second enlarged front end portion 137B proximal to but spaced apart from the first enlarged front portion 137 by a length of the first extension stretch 178. The hollow interior 175 of the extension segment 160 is structured to accommodate at least a portion of the first stem stretch 172. The hollow interior 175 has a generally smooth bore 176 of preferably constant diameter except for the reduced diameter interior stop 177 located proximal to the entrance of the bore 176. The first stem stretch 172 is snapped into and slidably positioned at least partially in the hollow interior 175 of the second extension stretch 179 of the extension segment 160. When the indicator rod 136 with the extension segment 160 is inserted into the housing 111, the enlarged front end 137 of the extension segment 160 is positioned in the first internal cavity 126 while the second extension stretch 179 (containing the first stem stretch 172) and the second stem stretch 173 are positioned in the second internal cavity 127.

This embodiment of the device 110 also includes means for urging the indicator rod 136 from the fully inserted position shown in FIG. 1A to extended positions with the cap 148 spaced from the flange 113 of the housing 111 shown for example in FIGS. 1B and 1C, when activated. One such means is provided by a coiled spring 155 disposed around the second extension stretch 179 of the extension segment 160 (initially) and the portion of the first stem stretch 172 extending out of the hollow interior 175 of the second extension stretch 179 (after activation). The spring 155 is compressed between the cylindrical neck region 124 of the housing 111 and the collar 146 of the indicator rod 136 when the indicator rod 136 is in the fully inserted position of FIG. 1A. Once the device 110 has reached a predetermined elevated temperature, the fusible material 159 in the hollow interior 175 and in the first internal cavity 126/ narrow bore 125 softens (preferably not simultaneously) and releases the extension segment 160 from the first internal cavity 126 and releases the first stem stretch 172 from the hollow interior 175, which allows the spring 155 to expand, thus moving the collar 146 away from the cylindrical neck region 124 and causing the indicator rod 136 to be displaced outwardly through the open end 120 of the housing 111.

The fusible material 159 in the hollow interior 175 softens first, at a first stage or time, allowing the indicator rod 136 to be urged partially out of the hollow interior 175, and the fusible material 159 in the first internal cavity 126 softens second, at a second stage or time, allowing the first extension stretch 178 to be urged at least partially out of the first internal cavity 126. The interior stop 177 cooperates with the stop 162 to prevent the indicator rod 136 from fully disengaging from the extension segment 160, and the annular restriction 122 cooperates with the collar 146 to prevent the indicator rod 136 from fully disengaging from the housing 111.

A fusible material 159 fills (a) the first internal cavity 126, including the narrow bore 125, around the first extension stretch 178, and particularly around the enlarged front end portion 137, and (b) the hollow interior 175 around the first stem stretch 172, and particularly around the enlarged front end portion 187. The fusible material 159 is in the form of a solid under normal conditions and is selected so that the fusible material 159 softens or melts at the desired temperature for the particular application. The fusible material 159 engages front end portion 137 and first extension stretch 178 to securely retain the extension segment 160 in the first internal cavity 126 and the fusible material 159 engages front end portion 187 and first stem stretch 172 to securely retain the indicator rod 136 in the hollow interior 175. The first extension stretch 178 and the first stem stretch 172 increase the surface area engaged by the fusible material 159 so that the combination of the extension segment 160 and the indicator rod 136 may be more securely retained within the housing 111.

The prior art embodiment of FIGS. 1A-1C and 2A-2B also comprise spacing fins 108 on the second stem stretch 173 proximal to the underside 149 of the cap 148. These optional additions assist in increasing the stability of the indicator rod 136 within the housing 111 by reducing the gaps between the indicator rod 136 and the bore 119.

FIG. 1A illustrates the inactivated position of this prior art embodiment, namely the inactivated position of the indicator rod 136 and the extension segment 160. FIG. 1B illustrates the first activation position of this embodiment indicating that a first temperature has been reached (the fusible material 159 in hollow interior 175 has been softened), namely the first activation position of the indicator rod 136 and the extension segment 160. FIG. 1C illustrates the second activation position of this embodiment indicating that a second temperature has been reached (the fusible material 159 in first internal cavity 126 has been softened), namely the second activation position of the indicator rod 136 and the extension segment 160.

As the extension segment 160 has a stretch with a hollow interior 175 rather than the indicator rod 136 having the stretch with the hollow interior, this is structurally and functionally distinct from the present invention. This prior art device 10 comprises only one indicating means, namely cap 148, which extends outwards from the housing 111 a first distant when the device 10 reaches a first temperature and extends outwards a second distance when a second temperature is reached. Thus, the cook is presented with only one visual indicator structure extending different distances outwardly from the meat. This can be visually confusing, as the cook may not at first glance know if the indicating means is extending out the full second distance or only the partial first distance. This prior art device 10 can generally serve to provide a background for this class of temperature indicating device, to which the present invention generally belongs.

With this generalized background as a foundation, embodiments and aspects of the present disclosure provide a novel and non-obvious multi-stage temperature indicating device. Unlike prior art multi-stage temperature indicating device, the multi-stage temperature indicating device of the present disclosure has a structural relationship amongst its components that minimizes the need for any strictly internal components entirely enveloped by another component and not visible/physically accessible by an assembler/user. This makes manufacturing, machining and assembly of the multi-stage temperature indicating device comparatively easier.

Additionally, the multi-stage temperature indicating device allows the user to readily differentiate between indication stages (also referred to as activation stages and activated positions) based on the position of various components relative to the position of various other components. Said another way, unlike the prior art, the multi-stage temperature indicating device does not require that a user keep track of the relative movement/displacement of one component to determine which indication stage is being represented by the apparatus. This can be confusing because a user may lose track of the previous position of a component once that same component has moved or been displaced again. For example, instead of having one component raise twice to two different heights, embodiments of the present invention have different nested components that rise up in stages. For a user that is occupied with other concerns, like cooking, this is much easier to interpret and keep track of over time.

Furthermore, and related to the above, certain embodiments of the multi-stage temperature indicating device have components configured for a larger and/or more obvious stroke (that is, more absolute movement and/or displacement relative to surrounding or encasing components) as these components do not require two or more extension heights for the different indication stages. For example, in the prior art, if the total possible stroke of a component is X and the apparatus has two stages represented by the movement of a single visible component, then the first stage is signaled by a stroke of for example X/2 and the second stage is signaled by a stroke of X. While this may seem insignificant, if the component is relatively small, it can be very difficult for a user to differentiate between the X/2 and X. Fortunately, in an embodiment of the present invention, a single component only has to move and/or displace once, which allows this one movement and/or displacement to take up the entire stroke. Therefore, a user observing the multi-stage temperature indicating device will readily realize when a component has extended because the stroke is maximized (that is, not divided by the total number of stages, for example).

Referring now to FIGS. 3A-3C, 4A-4C, 5A-5B, and 6A-6B, an embodiment of the multi-stage temperature indicating device 10 of the present invention comprises an indicator assembly 15 (best seen in FIGS. 5A, 6A, and 7A) made up of an inner indicator stem 60 (best seen in FIG. 8) and a middle indicator stem 36 (FIGS. 5A, 6A, and 7A). The middle indicator stem 36 defines a third internal cavity 75 configured to receive and cooperate with a nested inner indicator stem 60 such that the inner indicator stem 60 at least partially displaces and/or slides within the third internal cavity 75 of the middle indicator stem 36 without unintentionally disengaging from (sliding completely out of) the third internal cavity 75 of the middle indicator stem 36. In essence, the indicator assembly 15 has the inner indicator stem 60 functioning as a slidable stem relative to the middle indicator stem 36.

The device 10 also comprises an elongate housing 11 (best seen in FIGS. 3A-3C and 4A-4C) having a pointed tip 12 and a transversely extending flange 13 formed opposite the tip 12. The upper surface of the flange 13 is substantially planar; however, other structural configurations and shapes are envisioned. A plurality of barbs 14 (here shown two in number) is formed on the exterior of the housing 11. The shape, size, and number of exterior barbs 14 may vary as desired and are configured to securely hold the device 10 in place during storage, handling, and cooking of a product. The device 10 may be inserted into poultry, meat, or other products by positioning the pointed tip 12 against the product and pressing the device 10 inwardly until the underside of flange 13 engages the outer surface of the product.

The housing 11 is formed with a longitudinally extending bore 19 having end 20 proximate the flange 13 and a closed end 21 near the pointed tip 12. The open end 20 has a tapered opening to the bore 19 to facilitate assembly of the device 10. The bore 19 comprises an annular restriction 22 to assist in retaining the middle indicator stem 36 and the inner indicator stem 60 within the bore 19. The interior of the housing 11 includes a cylindrical neck region 24 and a choke or narrowed bore 25 spaced inwardly from the restriction 22. A first internal cavity 26 is located between the cylindrical neck region 24 and the closed end 21 of the bore 19 and generally includes narrowed bore 25. A second internal cavity 27 is located between the neck region 24 and the open end 20.

The indicator assembly 15 is slidably positioned in the bore 19 of the housing 11. The indicator assembly 15 comprises the inner indicator stem 60 slidably received by the middle indicator stem 36 via a third internal cavity 75 (best seen in FIGS. 5B, 6B, and 7B). The middle indicator stem 36 comprises a first stem stretch 72 and a second stem stretch 73. The second stem stretch 73 is configured relative to the first stem stretch 72 as a generally cylindrical barrel extending upwardly from the first stem stretch 72. As such, the second stem stretch 73 defines the third internal cavity 75.

The second stem stretch 73 of the middle indicator stem 36 comprises a lower region 32 and an upper region 33. The upper region 33 has a greater cross sectional diameter than the lower region 32. The outer surface of the both the lower region 32 and the upper region 33 are generally rounded and smooth; however, other configurations and structures are envisioned. A collar 46 of the middle indicator stem 36 separates the lower region 32 from the upper region 33.

The collar 46 has a greater cross sectional diameter than either of the lower region 32 or the upper region 33 such that the top surface of the collar 46 can interact with the restriction 22 when the middle indicator stem 36 is slidably received by the housing 11. As such, the collar 46 is configured to prevent the middle indicator stem 36 from fully exiting the housing 11 when the middle indicator stem 36 is transitioning from an inactivated position (best seen in FIGS. 3A and 4A), or a first activated position (best seen in FIGS. 3B and 4B), to the second activated position (best seen in FIGS. 3C and 4C). Moreover, the bottom surface of the collar 46 is configured to interact with an urging means, such as spring 55.

The second stem stretch 73 of the middle indicator stem 36 defines the third internal cavity 75, which extends from an opening 23 at one end of the middle indicator stem 36 to the beginning of the first stem stretch 72. About the opening 23 is a flange 31. The lower surface of the flange 31 is substantially planar and therefore structured and configured to engage with and rest against the upper surface of the flange 13 of the housing 11 when the device 10 is in either the inactivated position or the first activated position. The flange 31 prevents the middle indicator stem 36 from extending too far into the housing 11, and also acts as an indicating means. Instead of flange 13 and flange 31 having substantially planar complementary surfaces for flush mating, the upper surface of the flange 13 and the underside 49 of the flange 31 may define mating grooves and ridges or other complementary mating shapes if desired.

The first stem stretch 72 of the middle indicator stem 36 comprises two enlarged front end portions 37A and 37B configured to be received within the first internal cavity 26 of the housing 11. The first enlarged front end portion 37A is at the end of a first extension stretch 78, and the second enlarged front end portion 37B is proximal to, but spaced apart from, the first enlarged front portion 37A by a length of the first extension stretch 78A. First enlarged front end portion 37A and second enlarged front end portion 37B cooperate with the second fusible material 58 contained within the first internal cavity 26. The use of an enlarged front end portion 37 increases the surface area and enhances the geometry of the first extension stretch 78 such that the first extension stretch 78 can better engage with the second fusible material 58. An optional raised portion 39, which amounts to an additional collar around the first extension stretch 78, also increases the surface area and enhances the geometry of the first extension stretch 78.

When the middle indicator stem 36, with or without the inner indicator stem 60, is inserted fully into the housing 11, the enlarged front end portions 37A and 37B of the first stem stretch 72 are introduced into the first internal cavity 26. The narrowed bore 25 outlines the periphery of a portion of the internal cavity 26 located between first internal bore 26A and second internal bore 26B. Typically, the structure and configuration of the internal cavity 26 is sufficient to accommodate the two enlarged front portions 37A and 37B between the neck region 24 and the pointed tip 21. The second enlarged front portion 37B can have a diameter the same as, larger than, or smaller than the diameter of the first enlarged front portion 37A.

The front end portion 37 and the first stem stretch 72 are positioned in the first internal cavity 26 and the second stem stretch 73 is positioned in the second internal cavity 27. The middle indicator stem 36 is positioned in the bore 19 with the front end 37 being spaced inwardly, within the bore 19, from the cylindrical neck region 24. However, if desired, the housing 11 and middle indicator stem 36 may be configured to provide a different relationship between the neck region 24, the narrowed bore 25 and the internal cavities 26 and 27.

The third internal cavity 75 of the middle indicator stem 36 is structured to accommodate at least a portion of the inner indicator stem 60 to form the indicator assembly 15. The indicator assembly 15, when retained by the housing 11 to form the device 10, is configured to securely retain the inner indicator stem 60 such that the inner indicator stem 60 can slide (by a set first stroke distance or length) within the middle indicator stem 36. Moreover, the middle indicator stem 36, when retained by the housing 11, is configured to slide (by a set second stroke distance or length) within the housing 11.

The third internal cavity 75 of the middle indicator stem 36 comprises an annular restriction 77 configured to assist in retaining the inner indicator stem 36 within the third internal cavity 75. The annular restriction 77 is spaced between the opening 23 and the closed end 34 of the middle indicator stem 36. The third internal cavity 75 also includes a choke or narrowed bore 76 spaced inwardly from the annular restriction 77. A first internal volume 41 is located between the narrowed bore 76 and the closed end 34 of the third internal cavity 75. A second internal volume 42 is located between the annular restriction 77 and the narrowed bore 76.

The second stem stretch 73 of the middle indicator stem 36 defines a pair of antipodal and elongated guide channels 43A, 43B running lengthwise from a portion of the lower region 32 through the length of the upper region 33 up to the flange 31 (best seen in FIGS. 6B and 7B; 43B is hidden from view). The guide channels 43A, 43B are configured such that they traverse the middle indicator stem 36 from the outside surface to the inside surface, and such that the third internal cavity 75 is accessible. Preferably, the guide channels 43A, 43B do not traverse the flange 31. The guide channels 43A, 43B also are configured to extend through the collar 46 such that the collar 46 is divided into two halves 46A and 46B (best seen in FIGS. 4A-4C). The guide channels 43A, 43B function to facilitate the secure reception and sliding capability of the inner indicator stem 60, relative to the middle indicator stem 36, when the indicator assembly 15 is fully assembled, and to allow the urging means, such as spring 55, to act upon the inner indicator stem 60.

The inner indicator stem 60 of the indicator assembly 15 comprises a first stem stretch 70 and a second stem stretch 71. The second stem stretch 71 is configured relative to the first stem stretch 70 as a rod extending upwardly from the first stem stretch 70 and is terminated by an end region 65. The second stem stretch 71 is generally rounded and smooth; however, other configurations and structures are envisioned. An engagement portion 69 separates the first stem stretch 70 from the second stem stretch 71. The end region 65 represents a transition zone from the rod shape of the second stem stretch 71 to a cap 64 (best seen in FIG. 8).

The cap 64 of the inner indicator stem 60 is structured and/or configured to engage with and rest against the upper surface of the flange 31 of the middle indicator stem 36 when the multi-stage temperature indicator device 10 is in the unactivated position of FIG. 3A. Instead of flange 64 and flange 31 having substantially planar complementary surfaces for flush mating, the upper surface of the flange 31 and the underside 63 of the cap 64 may define mating grooves and ridges or other complementary mating shapes if desired.

In the illustrative embodiments shown in the figures, the end region 65 defines a progressively widening cross sectional width from the rod shape of the second stem stretch 71 to the cap 64. This is represented in one embodiment by the "V" shaped portion 62 (best seen in FIGS. 3A-3C and 5A) and the same portion 62 (best seen in FIGS. 4A-4C). Therefore, when inner indicator stem 60 is fully inserted into the third internal cavity 75 of middle indicator stem 36 (best seen in FIG. 3A), the opening 23 of the middle indicator stem 36 is configured and structured such that the end region 65 fits into the third internal cavity 75, and such that the cap 64 is recessed and/or nested into the opening 23. This seals the third internal cavity 75 and allows the cap 64 to be essentially flush with the flange 31. Instead of the end region 65, the cap 64 and flange 31 having the specific complementary structures of the FIGS. 3A-3C, 4A-4C, 5A-5B, and 6A-6B, the end region 65, the cap 64 and flange 31 may define other complementary mating shapes and structures if desired. The use of the "V" is entirely illustrative and has been used only as the applicant for this invention is Volk Enterprises, Inc. Any shape can be used for the end region 65, and it is anticipated that the shape of the end region 65 will be determined based on the use of the device 10 and/or the provider of the device and/or any other objective or subjective reason, so long as the end region 65 functions as disclosed herein.

The engagement portion 69 comprises a pair of antipodal extensions 67 and 68 about the inner indicator stem 60 (best seen in FIGS. 5B, 6B, and 8). The engagement portion 69 is configured to cooperate with the guide channels 43A and 43B, via the extensions 67 and 68, such that the middle indicator stem 36 securely retains the inner indicator stem 60. The guide channels 43A and 43B, with the extensions 67 and 68, function to allow the inner indicator stem 60 to securely slide (by a set stroke) in and out of the middle indicator stem 36 a set distance (best seen in FIGS. 3A, 3B, 4A, and 4B). The stroke of the inner indicator stem is defined by the displacement of the extensions 67 and 68 from one end of the guide channels 43A and 43B (proximate the closed end 34) to the other end (proximate the flange 31). The flange 31 functions to prevent the extensions 67 and 68 from unintentionally sliding out of the guide channels 43A and 43B.

The engagement portion 69 is also configured, in the first activated position of FIGS. 3B and 4B or the second activated position of FIGS. 3C and 4C, to cooperate with the collar 46 such that the extensions 67 and 68 fill the gaps between the halves 46A and 46B (best seen in FIGS. 4A-4C). Together, the extensions 67 and 68 and the collar 46 interact with the restriction 22 to prevent the indicator assembly 15 from fully exiting the housing 11. Moreover, the engagement portion 69, via the extensions 67 and 68, is also configured to interact with the spring 55 (described in greater detail herein).

The first stem stretch 70 of the inner indicator stem 60 comprises two enlarged front end portions 66A, 66B configured to be received within the first internal volume 41 and the second internal volume 42, respectively, of the middle indicator stem 36. The first enlarged front end portion 66A is at the end of the first stem stretch 70, and the second enlarged front end portion 66B is proximal to but spaced apart from the first enlarged front portion 66A by a length of the first stem stretch 70A. The second enlarged front portion 66B has a cross sectional diameter the same as or larger than the cross sectional diameter of the first enlarged front portion 66A. The first internal volume 41 is structured to sufficiently accommodate the first enlarged front portion 66A. Similarly, the second internal volume 42 is structured to sufficiently accommodate the second enlarged front portion 66B.

Therefore, when the inner indicator stem 60 is fully inserted into the middle indicator stem 36, the first enlarged front end portion 66A is introduced into the first internal volume 41 after the second enlarged front end portion 66B is pressed through the annular restriction 77 and introduced into the second internal volume 42. The inner indicator stem 60 is positioned in the third internal cavity 75 and spaced inwardly from the annular restriction 77. However, if desired, the middle indicator stem 60 and inner indicator stem 36 may be configured to provide a different relationship between the annular restriction 77, the narrowed bore 76, and the internal volumes 41, 42.

The device 10 also comprises means for urging the middle indicator stem 36 and/or the inner indicator stem 60 from the fully inserted position (best seen in FIGS. 3A and 4A) to the first activated position (best seen in FIGS. 3B and 4B), and to the second activated position (best seen in FIGS. 3C and 4C). When the device 10 is fully assembled and depending on the position, a spring 55 lies in the internal cavity 27 of the housing 11 in a space bound by various combinations of the bore 19 (of the housing 11), the cylindrical neck region 24 (of the middle indicator stem 36), the lower region 32, the first stem stretch 72, the collar 22 and the extensions 67 and 68 (of the inner indicator stem 60).

When the device 10 is in the inactivated position, the spring 55 is compressed by the cylindrical neck region 24 of the middle indicator stem 36 and the extensions 67 and 68 of the inner indicator stem 60. Once the device 10 has reached a first predetermined elevated temperature (see below for a full disclosure of the fusible materials 59 and 58 and their softening sequence), the spring 55 is allowed to decompress from the inactivated position to the first activated position. The spring 55 slides the extensions 67 and 68 and, therefore, the entire inner indicator stem 60, along the guide channels 43A and 43B of the middle indicator stem 36, respectively. The collar 46 prevents the spring 55 from decompressing any further and, therefore, the spring 55 is compressed by the cylindrical neck region 24, the collar 46, and the extensions 67 and 68.

Once the device 10 has reached a second predetermined elevated temperature, the spring 55 is allowed to decompress from the first activated position to the second activated position. The spring 55 slides the collar 46 and the extensions 67 and 68 and, therefore, the indicator assembly 15 a set distance out of the open end 20 of the housing 11. The annular restriction 22 of the bore 19 prevents the collar 46 and the extensions 67 and 68 from sliding any further out of the opening 20. In the second activated position, the flange 31 is displaced from the open end 20.

In the first embodiment shown in FIG. 3A, a first fusible material 59 fills the first internal cavity 26, including the narrow bore 25, of the housing 11 around the first extension stretch 72 of the middle indicator stem 36. In particular, the first fusible material 59 is around the enlarged front end portion 37. Moreover, a second fusible material 58 fills the first internal volume 41, including the narrowed bore 76, of the middle indicator stem 36. In particular, the second fusible material 59 is around the first enlarged front end portion 66A.

The first fusible material 59 and the second fusible material 58 are in the form of a solid under normal conditions and are selected so that the fusible materials 59, 58 soften or melt at a first desired temperature and second desired temperature, respectively, for the particular application. The fusible materials 59, 58 may be provided by various materials, including alloys, metals, organic materials, and the like. Alternatively, different types of fusible materials 59, 58 can be used, and by using different types of fusible materials 59, 58 as firing media, different triggering times and/or temperatures can be achieved between the stages. By different fusible materials it is meant fusible materials having different softening or melting temperatures.

In other embodiments of the device 10, it is envisioned that the first fusible material 59 and the second fusible material 59 may soften at the same desired temperature. If so, the second fusible material 58 may soften earlier than the first fusible material 59 simply because of the disparate rates of heat diffusion through the device 10 affecting the first fusible material 59 and the second fusible material 59. In certain illustrative situations, the second fusible material 58 softens or melts between 0 minutes and 60 minutes earlier, or between 10 minutes and 30 minutes earlier, or between 15 minutes and 30 minutes earlier, or approximately 15 to 20 minutes earlier, than the first fusible material 59, in an oven.

In the embodiment of FIGS. 3A-3C, 4A-4C, 5A-5B, 6A-6B, 7A-7B, and 8, the second fusible material 58 softens first, as heat penetrates the multi-stage temperature indicating device 10 from the top (the portion of the device at or near the surface of the food) down in a conventional oven, at a first stage or time, allowing the inner indicator stem 60 to be urged away from the middle indicator stem 36. The first fusible material 58 softens second, allowing the middle indicator stem 36 to be urged away from the housing 11. The outward displacements of the inner indicator stem 60 and the middle indicator stem 36 provide visual indications that the multi-stage temperature indicating device 10 has reached the desired temperatures.

FIGS. 3A and 4A illustrate the inactivated position of this embodiment. FIGS. 3B and 4B illustrate the first activated position of this embodiment indicating that a first temperature has been reached (the second fusible material 58 has been softened). FIGS. 3C and 4C illustrate the second activated position of this embodiment indicating that a second temperature has been reached (the first fusible material 59 has been softened).

Referring now to FIGS. 9, 10A-10B, and 11A-11B, a second embodiment of an inner indicator stem 60 comprises a first stem stretch 70, a second stem stretch 71, an end region 65, a cap 64, and an engagement portion 200. This embodiment is primarily distinguished from the embodiment presented in FIGS. 3A-3C, 4A-4C, 5A-5B, 6A-6B, 7A-7B, and 8 based on the differences between the engagement portion 200 (best seen in FIG. 9) and the engagement portion 69 (best seen in FIG. 8).

More specifically, the engagement portion 200, like the engagement portion 69, comprises a pair of antipodal extensions 67 and 68 about the inner indicator stem 60. The engagement portion 200 is configured to cooperate with the guide channels 43A and 43B of a middle indicator stem 36, via the extensions 67 and 68, such that the middle indicator stem 36 securely retains the inner indicator stem 60. Together, the extensions 67 and 68 and the collar 46 ideally interact with the restriction 22 to prevent an indicator assembly 15 from fully exiting the housing 11. Moreover, the engagement portion 200, via the extensions 67 and 68, is also configured to interact with the spring 55 when a multi-stage temperature indicating device 10 is fully assembled.

Unlike the engagement portion 69, the engagement portion 200 is elongated up along the second stem stretch 71 towards the end region 65 of the inner indicator stem 60. Therefore, when the inner indicator stem 60 is fully received by the middle indicator stem 36, the engagement portion 200 fills the gaps between the collar halves 46A and 46B (best seen in FIG. 11B) of the middle indicator stem 36. As such, regardless of whether the indicator assembly 15 is fully received by the housing 11 (best seen in FIGS. 10A and 11A), or fully extended out of (best seen in FIGS. 10B and 11B) the housing 11, the elongated portion of the engagement portion 200 supports and/or reinforces the halves 46A and 46B. This provides added support to the device 10 at the point of contact between the collar 46 and the annular restriction 22, which prevents compression of the middle indicator stem 36 by the annular restriction 22, even if the extensions 67 and 68 have not aligned with the collar 46.

Various alternate embodiments also are contemplated. For example, although the device 10 has been disclosed with the second fusible material 58 softening in the third internal cavity 75 first and the first fusible material 59 in the first internal cavity 26 softening second, the device 10 can be configured with the first fusible material 59 softening in the first internal cavity 26 first and the second fusible material 58 softening in the third internal cavity 75 second. For another example, additional stages can be used by incorporating additional extension segments.

While the invention has been described in connection with certain preferred embodiments, it is not intended to limit the spirit or scope of the invention to the particular forms set forth, but is intended to cover such alternatives, modifications, and equivalents as may be included within the true spirit and scope of the invention as defined by the appended claims.

What is claimed is:

1. A multi-stage temperature indicating device comprising:
    a first elongate housing defining a longitudinally extending first bore having a first open end opposite a first closed end, the first bore having an internal first narrowed bore region spaced from a second narrowed bore region, the first elongate housing having a first internal cavity defined between the closed end and the first narrowed bored region, and the first elongate housing having a second internal cavity defined between the first narrowed bore region and the second narrowed bore region;
    an indicator assembly slidably positioned in the first bore of the first elongate housing, the indicator assembly comprising:
        a middle indicator stem operating as a second elongate housing nested within the first elongate housing, the middle indicator stem defining a longitudinally extending second bore having a second open end, a second closed end, and a third narrowed bore region there between, the second bore having a third internal cavity defined between the third narrowed bore region and the closed end, the middle indicator stem having a first front portion and a means for preventing the middle indicator stem from sliding, beyond a first set stroke, out of the first elongate housing, the first front portion extending from the second closed end, away from the second open end, and configured to be received within the first internal cavity of the elongate housing; and
        an inner indicator stem slidably positioned in the second bore of the middle indicator stem, the inner indicator stem having a first stem stretch, a second stem stretch, an engagement portion, and a means for preventing the inner indicator stem from sliding, beyond a second set stroke, out of the middle indicator stem, a first portion of the first stem stretch configured to be received within the third internal cavity of the middle indicator stem, the engagement portion separates the first stem stretch from the second stem stretch and is configured to extend through the side of the middle indicator stem into the second internal cavity of the first elongate housing; and
        a first fusible material in the first internal cavity of the first elongate housing and a second fusible material in the third internal cavity of the middle indicator stem, the first fusible material configured to soften once a temperature is obtained at the first internal cavity, the second fusible material configured to soften once a temperature is obtained at the third internal cavity; and
        a means for urging the inner indicator stem, to the second set stroke, out of the middle indicator stem, and for sliding the middle indicator stem, to the first set stroke, out of the first elongate housing, the means for urging situated in the second internal cavity of the first elongate housing,
    wherein, when the first portion of the first stem stretch of the inner indicator stem is received within the third internal cavity of the middle indicator stem and surrounded by the first fusible material, and when the first fusible material softens, the means for urging the inner indicator stem displaces the inner indicator stem out of the middle indicator stem to the first set stroke; and
    wherein, when the first front portion of the middle indicator stem is received within the first internal cavity of the first elongate housing and surrounded by the second fusible material, and when the second fusible material softens, the means for urging the middle indicator stem displaces the middle indicator stem out of the first elongate housing to the second set stroke.

2. The multi-stage temperature indicating device of claim 1, wherein the means for preventing the middle indicator stem from sliding cooperates with the second narrowed bore region to prevent the middle indicator stem from sliding, beyond the first set stroke, out of the first elongate housing.

3. The multi-stage temperature indicating device of claim 1, further comprising:
    a fourth narrowed bore region between the third narrowed bore region and the second open end of the second bore of the middle indicator stem, the second bore having a fourth internal cavity defined between the third narrowed bore region and the fourth narrowed bore region; and
    a second portion of the first stem stretch of the inner indicator stem configured to be press fit through the fourth narrowed bore region and received within the fourth internal cavity of the middle indicator stem,
    wherein the means for preventing the inner indicator stem from sliding, beyond the second set stroke, out of the middle indicator stem is a cooperation between the fourth narrowed bore region of the middle indicator stem and the second portion of the first stem stretch of the inner indicator stem.

4. The multi-stage temperature indicating device of claim 1, wherein the means for urging the inner indicator stem out of the middle indicator stem and for sliding the middle indicator stem out of the first elongate housing is a compressible spring, the compressible spring surrounding the middle indicator stem in the second internal cavity of the first elongate housing.

5. The multi-stage temperature indicating device of claim 1, wherein the first fusible material is configured to soften at a first temperature, and the second fusible material is configured to soften at a second temperature.

6. The multi-stage temperature indicating device of claim 5, wherein the first temperature for softening the first fusible material is a higher temperature than the second temperature for softening the second fusible material.

7. The multi-stage temperature indicating device of claim 1, wherein the means for urging the inner indicator stem out of the middle indicator stem, and for sliding the middle indicator stem out of the first elongate housing, engages with the engagement portion of the inner indicator stem to slide the inner indicator stem, to the second set stroke, out of the middle indicator stem.

8. The multi-stage temperature indicating device of claim 1, wherein the means for urging the inner indicator stem out of the middle indicator stem, and for sliding the middle indicator stem out of the first elongate housing, engages with both the engagement portion of the inner indicator stem and the middle indicator stem to slide the middle indicator stem, to the first set stroke, out of the first elongate housing.

9. A multi-stage temperature indicating device comprising:
    a first elongate housing defining a longitudinally extending first bore having a first open end opposite a first closed end, the first bore having an internal first narrowed bore region spaced from a second narrowed bore region, the first elongate housing having a first internal cavity defined between the closed end and the first narrowed bored region, and the first elongate housing having a second internal cavity defined between the first narrowed bore region and the second narrowed bore region;
    an indicator assembly slidably positioned in the first bore of the first elongate housing, the indicator assembly comprising:
        a middle indicator stem operating as a second elongate housing nested within the first elongate housing, the middle indicator stem defining a longitudinally extending second bore having a second open end and a second closed end, the second bore having a third narrowed bore region spaced from a fourth narrowed bore region, the middle indicator stem having a third internal cavity defined between the third narrowed bore region and the closed end, the middle indicator stem having a fourth internal cavity defined between the third narrowed bore region and the fourth narrowed bore region, the middle indicator stem also having a first front portion and a means for preventing the middle indicator stem from sliding, beyond a first set stroke, out of the first elongate housing, the first front portion extending from the second closed end, away from the second open end, and configured to be received within the first internal cavity of the elongate housing; and
        an inner indicator stem slidably positioned in the second bore of the middle indicator stem, the inner indicator stem having a first stem stretch, a second stem stretch and an engagement portion, a first portion of the first stem stretch configured to be received within the third internal cavity of the middle indicator stem, a second portion of the first stem stretch configured to be press fit through the fourth narrowed bore region and received within the fourth internal cavity of the middle indicator stem so as to prevent the inner indicator stem from sliding, beyond the second set stroke, out of the middle indicator stem, the engagement portion separates the first stem stretch from the second stem stretch and is configured to extend through the side of the middle indicator stem into the second internal cavity of the first elongate housing; and
        a first fusible material in the first internal cavity of the first elongate housing and a second fusible material in the third internal cavity of the middle indicator stem, the first fusible material configured to soften at a first temperature in the first internal cavity, the second fusible material configured to soften at a second temperature in the third internal cavity; and
    a compressible spring for sliding the inner indicator stem, to the second set stroke, out of the middle indicator stem, and for sliding the middle indicator stem, to the first set stroke, out of the first elongate housing, the compressible spring situated in the second internal cavity of the first elongate housing,
    wherein, when the first portion of the first stem stretch of the inner indicator stem is received within the third internal cavity of the middle indicator stem and surrounded by the second fusible material, and when the second fusible material softens, the compressible spring decompresses and displaces the inner indicator stem out of the middle indicator stem to the first set stroke; and
    wherein, when the first front portion of the middle indicator stem is received within the first internal cavity of the first elongate housing and surrounded by the first fusible material, and when the first fusible material softens, the compressible spring decompress and displaces the middle indicator stem out of the first elongate housing to the second set stroke.

10. The multi-stage temperature indicating device of claim 9, wherein the means for preventing the middle indicator stem from sliding cooperates with the second narrowed bore region to prevent the middle indicator stem from sliding, beyond the first set stroke, out of the first elongate housing.

11. The multi-stage temperature indicating device of claim 9, wherein the compressible spring is surrounding the middle indicator stem in the second internal cavity of the first elongate housing.

12. The multi-stage temperature indicating device of claim 9, wherein the first fusible material is configured to soften once the first temperature is obtained, and the second fusible material is configured to soften once the second temperature is obtained.

13. The multi-stage temperature indicating device of claim 12, wherein the first temperature for softening the first fusible material is a higher temperature than the second temperature for softening the second fusible material.

14. The multi-stage temperature indicating device of claim 9, wherein the compressible spring engages with the engagement portion of the inner indicator stem to slide the inner indicator stem, to the second set stroke, out of the middle indicator stem.

15. The multi-stage temperature indicating device of claim 9, wherein the compressible spring engages with both the engagement portion of the inner indicator stem and the middle indicator stem to slide the middle indicator stem, to the first set stroke, out of the first elongate housing.

* * * * *